April 17, 1956  W. E. PATZER  2,742,187
LIQUID DISPENSING APPARATUS
Filed Feb. 16, 1954  2 Sheets-Sheet 1

INVENTOR
WALTER E. PATZER
BY Gustav Miller
ATTORNEY

April 17, 1956 — W. E. PATZER — 2,742,187
LIQUID DISPENSING APPARATUS
Filed Feb. 16, 1954 — 2 Sheets-Sheet 2
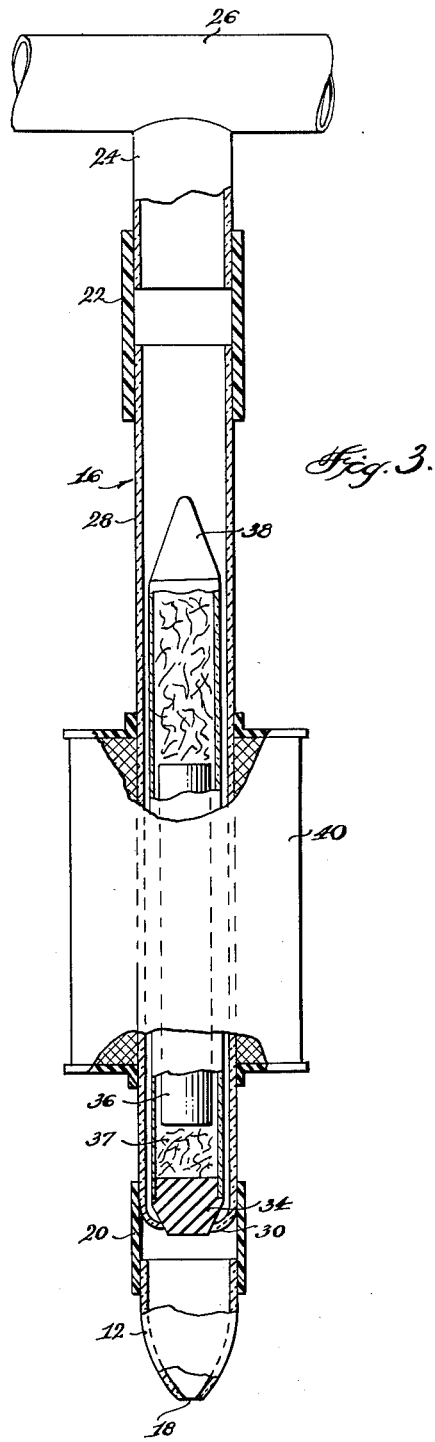
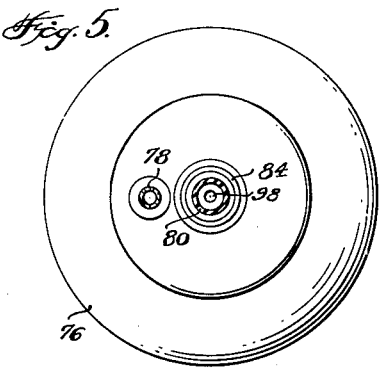
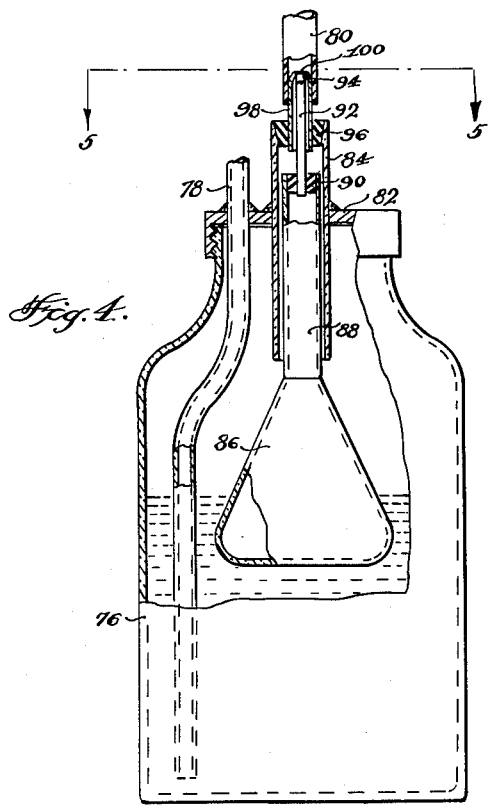
INVENTOR
WALTER E. PATZER
BY Gustave Miller
ATTORNEY

United States Patent Office 2,742,187
Patented Apr. 17, 1956

2,742,187

LIQUID DISPENSING APPARATUS

Walter E. Patzer, Madison, Wis.

Application February 16, 1954, Serial No. 410,530

2 Claims. (Cl. 222—70)

This invention relates to an apparatus for dispensing a measured quantity of liquid, and more particularly to an apparatus in which a plurality of pipettes accurately dispense predetermined quantities of liquid simultaneously.

In the chemical analysis of soils and of other materials, it is frequently necessary to dispense measured quantities of acid or other solutions into the material being analyzed. In the routine analyses of soils, for example, it may be desirable to dispense a chemical liquid, such as acid, into a plurality of tubes or bottles containing specimens or samples of the material being analyzed.

It is an object of this invention to provide an apparatus for accurately dispensing measured quantities of liquid.

It is another object of this invention to provide a liquid dispensing apparatus, particularly useful in the routine analysis of soil and of other such substances.

A further object of this invention is to provide a liquid dispensing apparatus in accordance with which measured quantities of liquids can be simultaneously dispensed into a plurality of containers.

Still another object of the invention is to provide a liquid dispensing apparatus particularly useful in laboratory analysis procedures which substantially eliminates human operator errors.

Still another object of this invention is to provide a liquid dispensing apparatus in which a plurality of pipettes simultaneously dispense measured quantities of liquid, with means being provided to insure a constant hydrostatic pressure in the dispensing system so that uniform quantities of liquid are dispensed in each dispensing operation.

In achievement of these objectives, this invention provides an apparatus comprising a plurality of liquid dispensing pipettes in which each pipette is provided with a control valve including a magnetic actuating member which is sealed in glass and operated by a solenoid which surrounds the pipette. The valves of the plurality of pipettes are simultaneously controlled by a cam operated switch which regulates the length of time that the solution flows from the pipettes. A further feature of the invention is the provision of means for maintaining constant hydrostatic pressure at the tips or outlet openings of the pipettes.

Further advantages of this invention will be apparent from the following description taken in connection with the accompanying drawings in which Fig. 1 is a front elevation view of a liquid dispensing apparatus in accordance with the invention;

Fig. 3 is an enlarged front elevation view, partially in section, of one of the pipette dispensing devices of the apparatus of Fig. 1;

Fig. 4 is an enlarged elevation view, partially in section, of the device which maintains the constant hydrostatic pressure in the apparatus of Fig. 1;

Fig. 5 is a top plan view of the device of Fig. 4.

Figure 1:
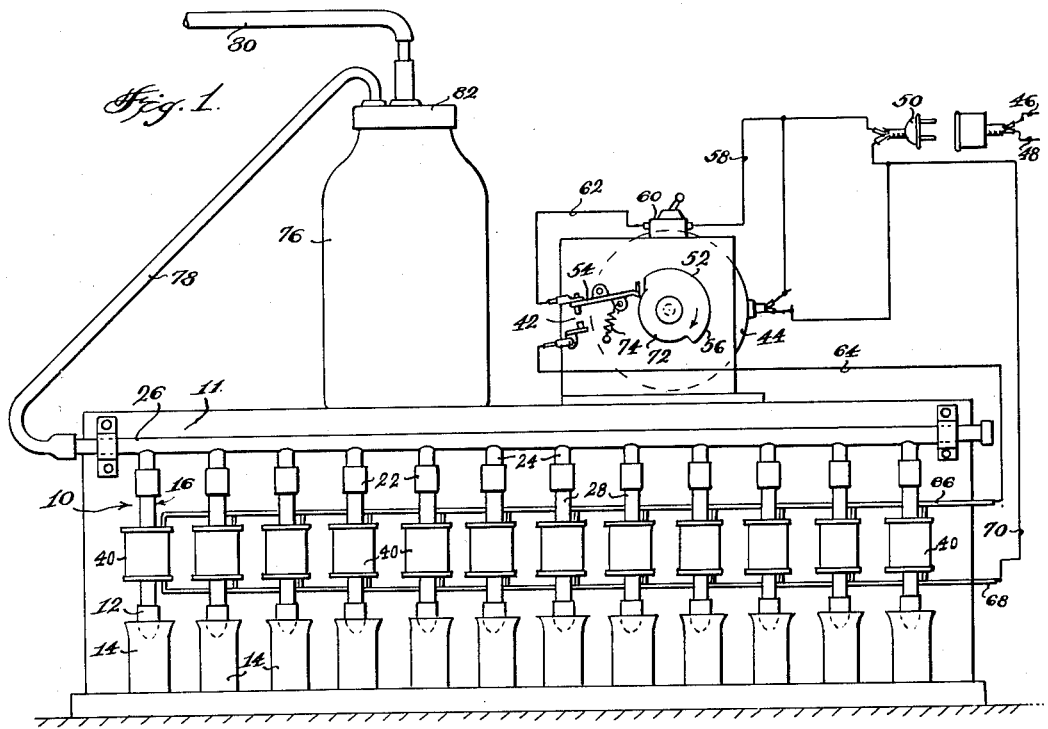
Figure 2:
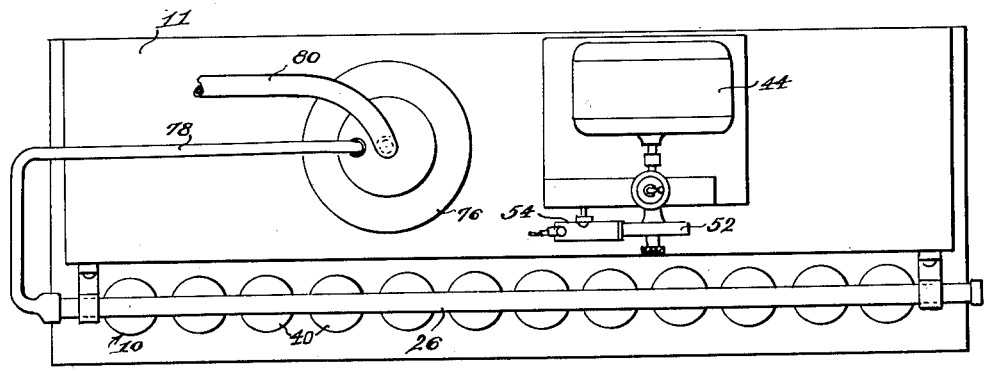
Fig. 2 is a plan view of the apparatus of Fig. 1.

Referring now to the drawings, the apparatus comprises a plurality of pipettes generally indicated at 10. The pipettes are supported on a suitable rack or cabinet 11. Each pipette is provided with a tip portion 12 at its lower end which dispenses the liquid into a bottle or container 14 which may contain the specimen to be analyzed, and a valve section generally indicated at 16, which controls the flow of liquid through the tip 12. As may be seen in the view of Fig. 3, the lower end of the tip 12 of each pipette is provided with a calibrated opening 18, which is matched with similar openings of the other pipettes. The upper end of the tip end 12 is connected to the lower end of the valve section 16, by means of a short piece of chemically resistant plastic tubing 20. The upper end of the valve section 16 is connected by a piece of plastic tubing 22 to the outlet 24 of a manifold pipe 26.

The valve section 16 comprises an outer tubular member 28, which is preferably made of Pyrex tubing, and which may have, for example, a diameter of 10 mm. The lower end of the outer tube portion 28 is constricted to a small diameter, which may be approximately 6 mm. in the case of a 10 mm. tube, to form a constricted opening 30. Coaxially positioned within the outer tubular member 28 is a tubular member 32 of smaller diameter which is preferably made of Pyrex tubing. For example, if the outer tubular member 28 has a diameter of 10 mm., the inner tubular member 32 may have a diameter of 7 mm. The lower end of the inner tubular member 32 is fused to provide a hemispherical end surface 34. The hemispherical end surface 34 is then ground to seat on the constricted opening 30 of the outer tubular member 28. The fused end portion 34 serves as a valve and the restricted opening 30 serves as a valve seat.

A cylindrical piece of magnetic material, such as a section of steel shaft 36 which may be for example 1¼ inches in length, is then sealed within the inner glass tube 32. A suitable packing material 37 such as glass wool, for example, may be positioned on either side of the steel shaft section in order to properly space it within the tubular member 32 and also to prevent any shifting of the steel shaft section. The upper end of the tubular member 32 is sealed, as shown at 38. A solenoid 40 is positioned coaxially around the outer surface of the outer tubular member 28 so as to surround the magnetic material contained in the tubular member 28.

It can be seen that when the solenoid 40 is energized, as will be explained hereinafter, the inner tubular member 32 is raised from the valve seat 30, due to the presence of the magnetic member 36 within the member 32.

In order to energize the solenoids 40 associated with the plurality of pipettes 10 to permit the dispensing of liquids from the pipettes into the bottles 14, the plurality solenoids 40 are electrically connected in parallel with each other but in series with a cam operated switch 42. An electric motor 44, which may be a 6 R. P. M. synchronous motor, for example, is connected across the power lines 46 and 48 by means of a suitable switch or plug-in connector means 50. The motor 44 drives a cam member 52 which is suitably insulated from the motor. The cam actuates a pivotally mounted contact member 54 of switch 42 in such manner that when the raised portion 56 of the cam engages the pivoted contact 54, the contact 54 is moved into closed position, in which the solenoids 40 are energized. The closing of cam operated switch contact 54 completes the following circuit: From power line 46 through conductor 58 through manually operated switch 60, which is assumed to be in closed position, through conductor 62, through the closed contact 54, through the conductor 58 through manually operated switch 60, which is assumed to be in closed position, through conductor 62, through the closed contact 54, through the conductor 64, to the bus member 66, through the plurality of solenoids 40 in parallel to the opposite bus member 68, thence through conductor 70 to the opposite side of power at line 48.

As long as the raised portion 56 of the cam 52 is in contact with the end of the pivotally mounted contact member 54, the electrical circuit to each of the solenoids 40 is energized and each of the respective inner tubular members 32 with its magnetic element 36 is raised so as to raise each valve element 34 from its respective valve seat 30. This permits liquid to pass downwardly from the manifold 26 through the outer tubular member 16, the liquid flowing around the exterior surface of the inner tubular member 32, through the orifice 30, and thence through the matched opening 18 of the tip member 12. As soon as the contact member 54 drops off the raised surface 56 of the cam and onto the lower surface 72 of the cam, the contact 54 returns to open position due to the biasing effect of spring 74. The solenoids 40 then become deenergized and the inner tubular members 32 return by gravity to the position shown in Fig. 3, in which the valve end 34 is seated on the valve seat 30, to thereby cut off the flow of liquid into the tip portion 12.

When the tips 12 of the plurality of pipettes are provided with calibrated matched openings 18 the amount of solution dispensed from each pipette will be the same as that dispensed by the other pipettes. Furthermore if the hydrostatic pressure of the system is maintained constant, the amount of solution dispensed during each dispensing operation will be the same.

As a further feature of the invention, I provide a means for maintaining a constant hydrostatic pressure in the dispensing system. As will best be seen in Figs. 1, 4 and 5 a large flask member 76 which may have a capacity of approximately one gallon, is connected by means of a syphon tube 78 to the manifold 26 to which the inlets 24 of the pipettes 10 are connected. Flask 76 is itself supplied with liquid through a conduit or supply tube 80, which is connected to a supply tank or carboy of the solution. The flask 76 is of the wide-mouthed type and is provided with a cover 82. The cover 82 is drilled to permit passage of the syphon tube 78 and also to permit passage of a centrally located guide tube or sleeve 84 which extends downwardly for a short distance into the interior of the flask 76. A float means such as flask 86 which may be in the form of a small 250 ml. flask for example, is positioned within the flask 76, the float flask 86 having an elongated neck portion 88, which extends upwardly through the guide tube 84. The upper end of the float flask 86 is closed by a plug 90, which serves as a support for a tubular member 92, having a sealed end 94, similar to the sealed end 34 of the pipette 10. The sealed end 94 serves as a valve element to control admission of liquid to the flask 76. The upper end of the guide sleeve 84 is provided with a plug 96, through which extends a short tubular section 98 of larger diameter than the tubular section 92. The tubular section 98 is provided at its upper end with a constricted opening 100 which serves as a valve seat for the sealed end 94 of the tubular section 92. The tubular conduit 80 leading to the supply tank or carboy for the solution in turn is connected to the tubular section 98.

It can be seen that when a liquid level in the large flask 76 reaches a predetermined height, the float flask 86 will be raised sufficiently to cause the valve element 94 to seat upon the restricted opening 100 so as to shut off the supply of liquid through the tubular conduit 80 to the interior of flask 76. However, when the supply of liquid within the flask 76 drops below a predetermined height, the float flask 86 will drop with the liquid level in such manner that the valve element 94 will become unseated from the valve seat 100, thereby permitting liquid from the carboy to flow through the conduit 80, through the orifice 100, through the tubular section 98, through the guide sleeve 84, and into the interior of the flask 76. As soon as the liquid in the flask 76 has again reached its predetermined level, the valve element 94 will again close the orifice 100. Thus, the hydrostatic pressure at the delivery orifices of the pipettes remains practically constant.

The amount of solution delivered from the pipettes may be readily varied by adjusting the time interval during which the switch 54 remains closed by changing the proportions of the cam surfaces 56 and 72. Furthermore, the provision of manually operated switch 60 in series with the cam operated switch 42 permits the solenoids 40 to be manually de-energized even though the switch 54 is closed. Individual switches may be provided in series with each of the individual solenoids 40, if desired, to permit independent opening of the circuits of any of the individual solenoids, so that the solution will not be delivered from any particular pipette if desired.

It can be seen from the foregoing, there is provided in accordance with this invention a liquid dispensing apparatus which is simple and certain in its operation. The apparatus permits a predetermined amount of solution to be dispensed from a plurality of pipettes in such manner as to substantially eliminate human operator errors.

Furthermore, the dispensing operation is automatically controlled by an easily adjustable and accurate timing device. The invention also provides an arrangement for providing constant hydrostatic pressure at the delivery orifices of the pipettes, thereby insuring a uniform quantity liquid dispensed during each dispensing operation.

While there has been shown and described a particular embodiment of the invention, it will be obvious to those skilled in the art that various changes and modifications may be made therein without departing from the invention, and therefore it is aimed to cover all such changes and modifications as fall within the true spirit and scope of the invention.

Having thus set forth and disclosed the nature of this invention what is claimed is:

1. A liquid dispensing apparatus comprising a plurality of pipettes, each of said pipettes comprising an outer tubular member having a concaved spherical valve seat at one end and an inner tubular member axially movable within said outer tubular member, magnetic material carried by the inner tubular member of each of said pipettes, a convexed spherical valve element carried by the inner tubular member of each of said pipettes, the valve element of each of said inner tubular members being adapted to seat on the valve seat carried by the outer tubular member of the respective pipette, an electromagnetic solenoid surrounding the outer tubular member of each of said pipettes, the plurality of solenoids for said plurality of pipettes being electrically connected in parallel with each other, and timing means for closing the electrical circuits of said solenoids for predetermined periods of time to cause axial movement of said inner tubular members of said plurality of pipettes whereby flow of liquid through said pipettes is controlled.

2. A liquid dispensing pipette comprising an outer tubular member, means for admitting liquid to the interior of said outer tubular member, an end of said outer member being restricted to provide a concaved hemispherical valve seat, an inner tubular member axially movable within said outer member, a valve element carried by an end of said inner member, said valve element having a convexed hemispherical surface and being adapted to seat on said valve seat, magnetic material disposed within said inner tubular member, an electromagnetic solenoid surrounding said outer member in the region of said magnetic material, said electromagnetic means being effective to shift said inner member to cause said valve element carried by said inner member to open said restricted opening of said outer member.

References Cited in the file of this patent

UNITED STATES PATENTS

| Number | Name | Date |
|---|---|---|
| 485,942 | Jackson | Nov. 8, 1892 |
| 502,969 | Jackson | Aug. 8, 1893 |
| 2,144,465 | Selleck | Jan. 17, 1939 |
| 2,442,599 | Herrick | June 1, 1948 |
| 2,656,856 | Brumberg | Oct. 27, 1953 |
| 2,659,516 | Smith | Nov. 17, 1953 |